United States Patent [19]

Youngdale

[11] 4,197,926
[45] Apr. 15, 1980

[54] BRAKE AND STEERING KNUCKLE APPARATUS

[75] Inventor: Ralph A. Youngdale, Union Lake, Mich.

[73] Assignee: Chrysler Corporation, Highland Park, Mich.

[21] Appl. No.: 964,001

[22] Filed: Nov. 27, 1978

[51] Int. Cl.² ............................................. F16D 65/02
[52] U.S. Cl. .................................. 188/18 A; 188/73.3
[58] Field of Search ............... 188/18 A, 73.3, 206 R, 188/218 XL

[56] References Cited

U.S. PATENT DOCUMENTS

| 3,352,518 | 7/1967 | North et al. | 188/18 A |
| 3,805,925 | 4/1974 | Schoenhenz | 188/73.3 |
| 3,917,032 | 11/1975 | Hoffman et al. | 188/73.3 |
| 4,034,857 | 12/1977 | Kondo et al. | 188/73.3 |
| 4,051,926 | 10/1977 | Karasudani | 188/73.3 |

FOREIGN PATENT DOCUMENTS

| 1528630 | 5/1968 | France | 188/18 A |
| 967408 | 8/1964 | United Kingdom | 188/18 A |

Primary Examiner—Duane A. Reger
Attorney, Agent, or Firm—Baldwin & Newtson

[57] ABSTRACT

An improved brake caliper and steering knuckle assembly. The caliper is mounted between arms extending from the steering knuckle and attached to the arms in a manner which forms a solid bridge between the arms. The caliper arms so connected transfer a force placed on an arm to the other arm or arms.

1 Claim, 5 Drawing Figures

BRAKE AND STEERING KNUCKLE APPARATUS

BACKGROUND OF THE INVENTION

1. Field of the Invention

In one aspect, this invention relates to braking systems. In a further aspect, this invention relates to steering systems associated with disc brakes.

2. Prior Art

Conventional disc brakes have a rotor which is rotatably mounted on a wheel spindle to turn with the wheel and tire. To stop, the vehicle brake pads are forced into engagement with the turning rotor. Generally, the pads are mounted on a caliper which has two arms, one arm on each side of the rotor and means to activate at least one arm so as to bring the pads into contact with the rotor's surface. The caliper must be rigidly mounted on the car chassis to prevent it from rotating with the rotor when the brake pads are in contact with the rotor. One commonly accepted method of mounting the caliper is to fasten the caliper to a torque plate which is in turn rigidly mounted on the wheel spindle.

The provision of a torque plate necessitates the use of numerous parts and requires additional labor during the assembly process. The additional parts mean increased weight in the brake assembly, which increases the vehicle's weight and reduces gas mileage.

It would be preferable to mount the caliper directly on the steering knuckle thereby eliminating the torque plate and its attendant weight. However, merely mounting the caliper on a steering knuckle creates a new series of problems. During braking the caliper creates a large twisting moment, which must be considered in the design. The twisting moment is normally transferred to the portion of the steering knuckle in front of the caliper thereby placing most of the braking torque on one small portion of the steering knuckle. The effected portion must be strengthened and designed to absorb the entire load.

SUMMARY OF THE INVENTION

It is an object of this invention to provide a brake system where the braking torque is distributed to more than one supporting member of the steering knuckle to which the brake caliper is attached.

It is a further object of this invention to provide a fastening structure which will distribute the brake torque to all supporting members.

Briefly, the brake system of this invention has a caliper which is attached to and carried between two or more arms or paddles, which extend from a steering knuckle attached to the wheel spindle of the vehicle. The arms extend along the sides of the caliper housing. The arms contain the caliper housing and prevent the housing from rotating when the brake pads engage the rotor. The arms extend axially with respect to the spindle and are fastened to the caliper in such a manner that the two arms are essentially rigidly connected thereby ensuring that a force applied to one arm is transmitted in part to the other arm or arms.

DETAILED DESCRIPTION OF PREFERRED EMBODIMENT

Figure 1:
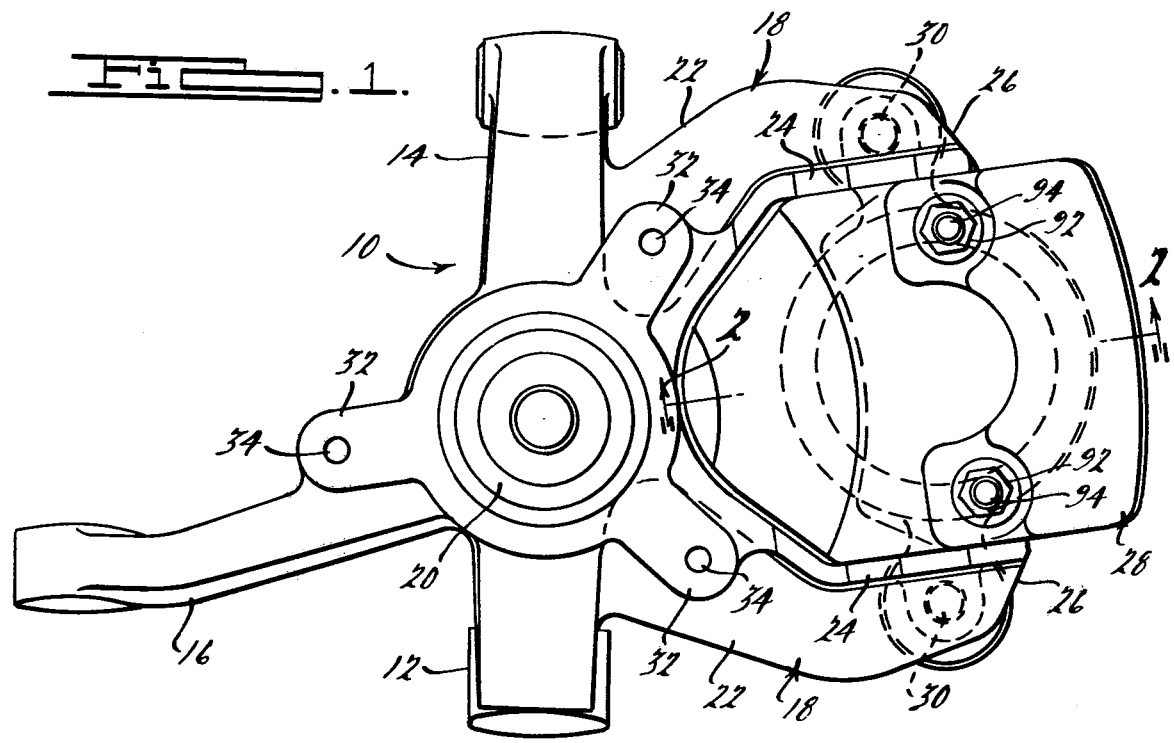
FIG. 1 is a side view of a caliper and steering knuckle assembly according to this invention, with the brake rotor removed.

Referring initially to FIG. 1, the steering knuckle 10 is adapted to be connected to a vehicle front suspension in the usual manner. A lower ball joint arm 12 would be connected to the lower ball joint and the upper ball joint arm 14 would be connected to the upper ball joint. Such ball joint connections are well known in the art and not shown.

The steering control arm 16 is attached to a tie rod in a well known manner to allow steering of the vehicle. The ball joint and steering arms are connected to the inner portion of a wheel spindle 20.

A pair of caliper support arms 18, are connected to and extend radially outward from the spindle 20. The caliper support arms 18 have a web section 22, which lies in a plane approximately parallel to the plane of the rotor and enlarged flattened faces 24 located at the free end 26 of the arms 18 which provide supporting surfaces for the caliper and reaction faces against which a caliper 28 is forced during braking. The caliper 28 is attached to the caliper support arms 18 by means of two threaded bolts 30 to provide a rigid connection between the arms. The method of connection is described in greater detail hereinafter.

The spindle has three raised bosses 32 with apertures 34 for mounting a splash shield 35 (shown in FIG. 3) to protect the brake rotor from debris.

Figure 2:
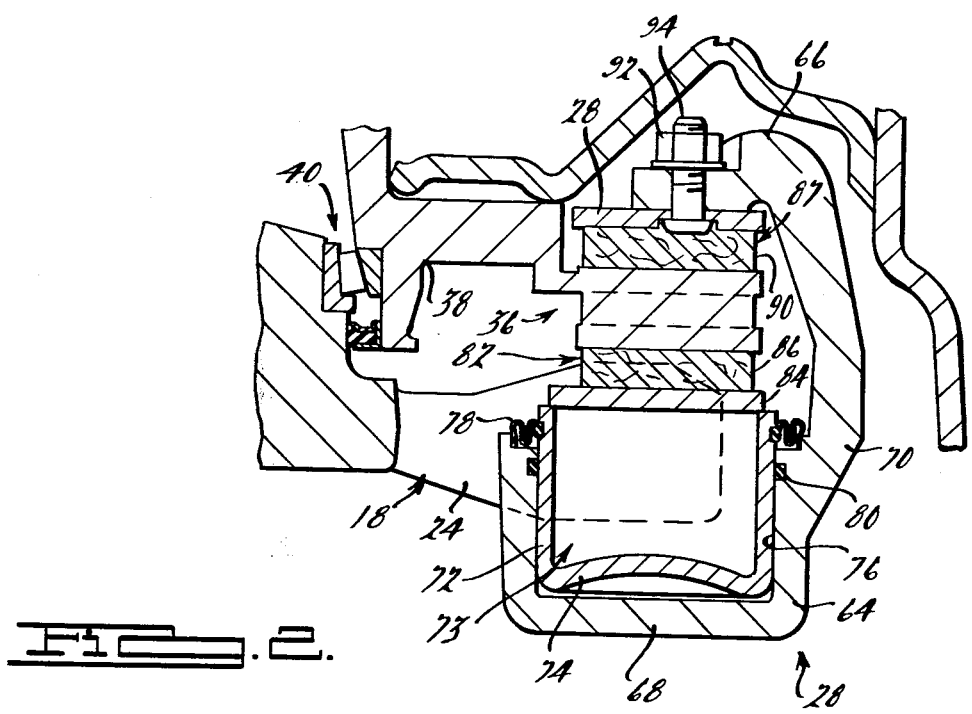
FIG. 2 is a view of a section taken through the caliper along the line 2—2 of FIG. 1.
Figure 3:
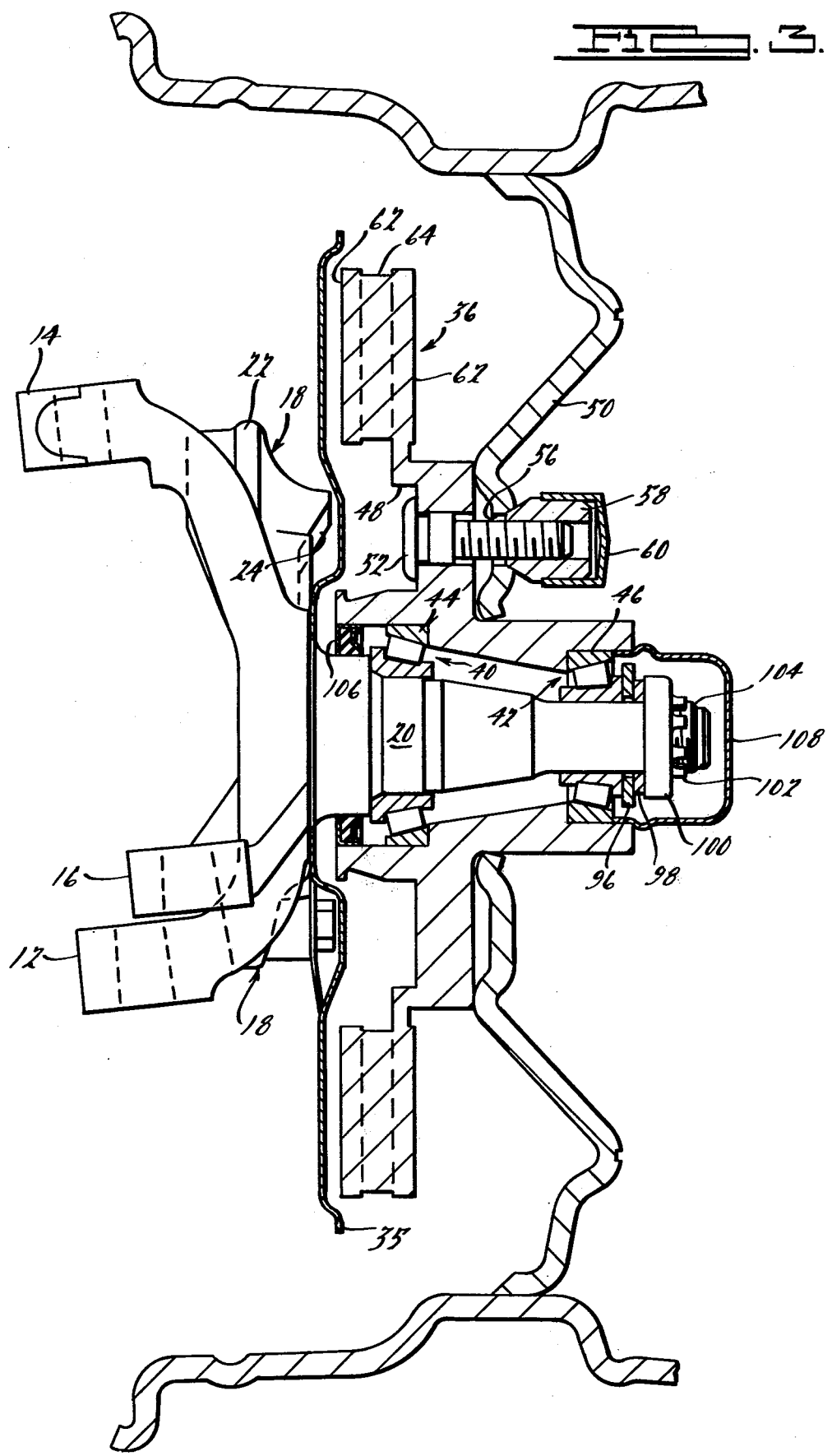
FIG. 3 is a view in partial section showing a steering knuckle, spindle and rotor assembly.

FIGS. 2 and 3 show in greater detail the arrangements of the internal workings of the caliper 28, brake rotor 36 and the caliper support arms 18 in conjunction with the spindle 20. The rotor 36 has a hub portion 38 mounted on bearing members 40 and 42. The rotor's radially inner portion is attached to the outer races 44, 46 of the bearing members and an intermediate portion 48 of the rotor has a wheel 50 attached thereto, the rotor 36 rotating with the wheel. The rotor 36 and wheel 50 are fastened together by means of a plurality of threaded studs 52 anchored in corresponding apertures 54, the studs passing through an aperture 56 in the wheel and a complementary nut 58 is threaded on the stud and tightened to force the wheel 50 into contact with the intermediate rotor portion 48. A plastic cap 60 is slipped over the nut 58 to protect the threads from corrosion.

The rotor 36 has a pair of oppositely disposed brake shoe engaging faces 62 connected by a center portion 64 comprising a plurality of radially extending ribs which form vents, such a structure being well known in the art.

The caliper 28 comprises a generally C-shaped housing 64 providing generally opposed legs 66, 68 disposed on opposite sides of the rotor and connected by an intermediate leg 70. A fluid motor 73 is carried by the caliper leg 68 and includes a piston 74 slideably disposed in a cylinder bore 76 formed in the leg. A flexible dust seal 78 has one end fixed to the bore 76 and an end fixed to the piston to prevent contamination of the sliding piston and cylinder bore surfaces. An annular fluid seal 80 is disposed in a groove in the leg 68 and retains the fluid within the motor. Upon brake activation the piston moves radially outward from the bore 76 engaging a brake shoe 82 that includes backing plate 84 and a frictional material brake lining 86, the lining being suitably secured to the backing plate by rivets, adhesive or the like. A second brake shoe 87 comprising a backing plate 88 and a brake lining 90 are bonded together and positioned so that the brake lining is in an opposed relationship to the other braked shoe 82. As shown, the brake shoe 87 is attached to the caliper leg 66 by means of a threaded nut 92 and bolt 94.

The brake shoes 82, 87 are slideably supported by the caliper 28 for movement in a direction generally perpendicular to the plane of rotation of the rotor. There are various mechanical schemes for mounting said braking shoes well known in the art. During braking the piston face 72 moves the associated brake shoe 82 in the direction perpendicular to the face of the rotor until the shoe 82 begins to engage the face of the rotor. At this point, the reaction force between the piston and its related caliper leg 68 forces the caliper 28 in the direction opposite the first braking shoe drawing the leg 66 and the opposed braking shoe towards the rotor until the frictional material 86, 90 engages both faces of the rotor stopping the vehicle.

FIG. 3 shows in greater detail the steering knuckle 10 of this invention in its operating environment. The knuckle 10 is shown attached to the spindle 20 having the rotor 36 mounted thereon as described hereinbefore. The rotor is shaped to hold the bearing members 50 and 42 therein, the outer bearing member 42 being firmly held against axial motion along the spindle 20 by a thrust washer 96 and a nut 98. The nut 98 is prevented from turning by a locking member 100 having a plurality of metal fingers 102 engaging the threads 104 on the end of the spindle. The bearings are packed in grease and a grease seal 106 is disposed at the inner portion of the spindle and a grease cap 108 covers the threaded end of the spindle.

Figure 4:
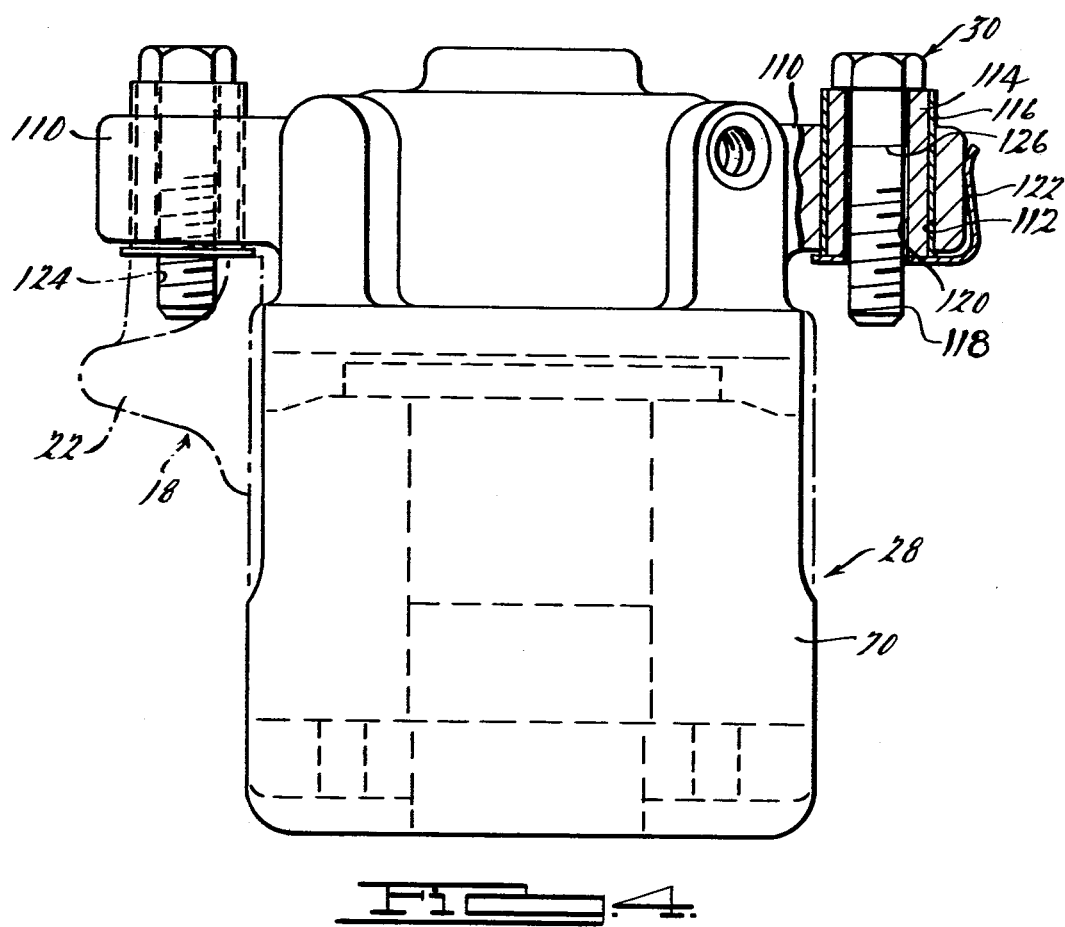
FIG. 4 is a view in partial section of a brake caliper showing one method of mounting a caliper to a steering knuckle.

FIG. 4 shows a preferred method for mounting the caliper 28 on the steering knuckle 10 according to this invention. The caliper housing has two ears 110 extending outward from the housing in a plane parallel to the plane of rotation of the rotor of the disc brake. The ears 110 have an aperture 112 passing therethrough with a pin 114 passing through the aperture. The peripheral surface of the pin 114 is coated with a low friction material 116 such as polytetrafluoroethylene polymer. The pin 114 has an interior bore 120 suitably shaped to receive the threaded bolt 30 therein. The bolt 30 has a threaded section 118 which is slightly smaller than the pin's bore 120 so that the threaded portion 118 of bolt 30 can pass easily through the bore, engage a clip 122 and engage a complementary threaded portion 124 in the steering knuckle. Because the threaded section is smaller than the bore 120 the bolt can be slid through the bore with a minimum of force and will go down and begin to engage the threads in the aperture in the yoke before a raised shoulder portion 126 near the head of the bolt enters the bore. The raised shoulder portion 126 will frictionally engage the bore 120 of the metallic sleeve 114 forming a rigid connection. Because the raised portion of the bolt rigidly contacts the inner portion of the metallic sleeve and the sleeve is essentially rigidly mounted within the aperture, the two arms 18 are connected by a rigid bridge so that a force applied to one arm due to braking will be transmitted in part to the other arm. The thin layer of polymeric material allows only an insignificant amount of twisting while the caliper housing can slide axially with respect to the bolt 30 in reaction to the braking force supplied on the inner brake shoe by the piston.

Figure 5:
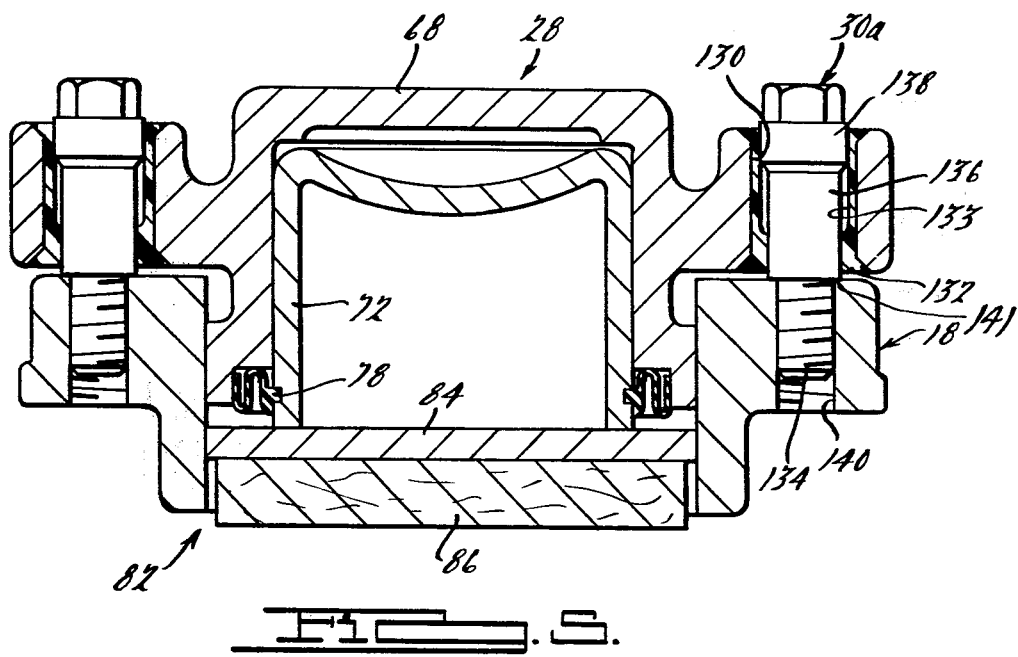
FIG. 5 is a second method of mounting a brake caliper to a steering knuckle.

A second method for mounting the caliper housing is shown in FIG. 5. In this embodiment the caliper 28 has a bore 130 therethrough containing a shaped hard rubber sleeve 132 which has a stepped bore 133 with an enlarged portion near the head of the bolt 30 and a smaller reduced section. The shaped bolt or stud 30a has a reduced threaded section 134 and an enlarged shoulder section 136 followed by chamfered enlarged third section 138. The thin threaded portion 140 of bolt 30a can be passed entirely through the shaped bore 133 to a point where it can engage the threads in the threaded aperture 140 in a boss 141 on the arms 18 before the enlarged sections of the bolt 30a contacts the sleeve. This allows an easy insertion of the bolt even when the bore 130 and bore 140 are slightly misaligned. Once the threaded portions of the bolts 30a are engaged in the threaded aperture, a tightening of the bolts will draw the shoulder portions of the bolts into a tight frictional engagement with corresponding inner portions of the bore 123 sleeve. Because the bolt 30a does not have to be forced through the entire bore in the polymeric sleeve, the polymer can be a dense high durometer material; which once the caliper is firmly fastened to arms 18, the pins and caliper housing form an essentially solid bridge between the two arms.

Various modifications and alterations of this invention become apparent to those skilled in the art without departing from the scope and spirit of this invention. It is understood that this invention is not limited to illustrative embodiment set forth hereinbefore.

What is claimed is:

1. A mounting system for a caliper brake housing to be attached to a vehicle comprising:
   a plurality of arms mounted within said vehicle, said arms having a first fixed end firmly attached to said vehicle and a second free end juxtaposed the caliper housing, said free end of said arm having a boss thereon, the boss containing a threaded aperture;
   projections extending from said caliper housing, said projections having a bore therethrough, the bore in said projection being axially aligned with the bore of a complementary arm,
   a polymeric sleeve disposed within the projection bore, said sleeve having a first internal diameter located at the end of the polymeric sleeve nearest the boss and a second diameter larger than the first diameter through the remainder of the polymeric sleeve;
   a stud having a threaded portion with an external diameter smaller than the first diameter of said polymeric sleeve and adapted to engage the threaded bore in said boss, a second enlarged smooth shaft section having a diameter with an interference fit with the first diameter section of said sleeve and forming a shoulder with said threaded section the shoulder being drawn into engagement with said boss when said threaded portion is tightened in said threaded bore, a third raised portion on the stud near the end of the stud distal the boss, said third raised portion forming an interference fit with said second larger diameter portion of said polymeric sleeve, said stud providing an axial slide means for said caliper housing with substantially no circumferential or radial displacement.

* * * * *